(12) United States Patent
Lee et al.

(10) Patent No.: US 10,001,814 B2
(45) Date of Patent: Jun. 19, 2018

(54) ELECTRONIC DEVICE WITH FIRST BODY AND SEPARABLE SECOND BODY

(71) Applicant: Samsung Electronics Co., Ltd., Gyeonggi-do (KR)

(72) Inventors: Dong-Il Lee, Gyeonggi-do (KR);
Dong-Hak Kim, Gyeonggi-do (KR);
Ki-Hee Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 21 days.

(21) Appl. No.: 15/110,031

(22) PCT Filed: Jan. 6, 2015

(86) PCT No.: PCT/KR2015/000099
§ 371 (c)(1),
(2) Date: Jul. 6, 2016

(87) PCT Pub. No.: WO2015/102465
PCT Pub. Date: Jul. 9, 2015

(65) Prior Publication Data
US 2016/0327994 A1 Nov. 10, 2016

(30) Foreign Application Priority Data
Jan. 6, 2014 (KR) .................. 10-2014-0001539

(51) Int. Cl.
*G06F 1/16* (2006.01)

(52) U.S. Cl.
CPC .......... *G06F 1/1681* (2013.01); *G06F 1/1616* (2013.01); *G06F 1/1618* (2013.01);
(Continued)

(58) Field of Classification Search
CPC .... G06F 1/1616; G06F 1/1618; G06F 1/1624; G06F 1/1679; G06F 1/1681; G06F 1/1654; G06F 1/1669
See application file for complete search history.

(56) References Cited

U.S. PATENT DOCUMENTS

2005/0057516 A1 3/2005 Ghosh et al.
2005/0264988 A1* 12/2005 Nicolosi ............... G06F 1/1626
361/679.44
(Continued)

FOREIGN PATENT DOCUMENTS

| KR | 2020120002190 | 3/2012 |
| KR | 2020120008365 | 12/2012 |
| KR | 1020140000043 | 1/2014 |

OTHER PUBLICATIONS

PCT/ISA/237 Written Opinion issued on PCT/KR2015/000099 (pp. 5).

(Continued)

*Primary Examiner* — James Wu
(74) *Attorney, Agent, or Firm* — The Farrell Law Firm, P.C.

(57) ABSTRACT

Provided is an electronic device including a first body, a second body, and a support member. The second body is separably installed such that at least a part of an area thereof overlaps a mounting surface of the first body. The support member is installed on the first body to open at a predetermined cradling angle, thereby cradling the second body on the first body to improve user convenience, maximize portability when the electronic device is coupled, and protect the electronic device from external forces, thereby contributing to improvement of reliability of the electronic device.

13 Claims, 17 Drawing Sheets

(52) U.S. Cl.
CPC .......... G06F 1/1624 (2013.01); G06F 1/1679 (2013.01); *G06F 1/1654* (2013.01); *G06F 1/1669* (2013.01); *G06F 2200/1633* (2013.01)

(56) References Cited

U.S. PATENT DOCUMENTS

| | | | |
|---|---|---|---|
| 2010/0309617 A1* | 12/2010 | Wang | F16M 11/10 361/679.01 |
| 2012/0008269 A1* | 1/2012 | Gengler | G06F 1/1626 361/679.09 |
| 2012/0327580 A1 | 12/2012 | Gengler | |
| 2013/0134061 A1 | 5/2013 | Wu et al. | |
| 2013/0170125 A1 | 7/2013 | Liang et al. | |
| 2013/0329351 A1 | 12/2013 | Lin | |

OTHER PUBLICATIONS

PCT/ISA/210 Search Report issued on PCT/KR2015/000099 (pp. 3).
European Search Report dated Sep. 8, 2017 issued in counterpart application No. 15733161.2-1879, 8 pages.

* cited by examiner

ELECTRONIC DEVICE WITH FIRST BODY AND SEPARABLE SECOND BODY

PRIORITY

This application is a National Phase Entry of PCT International Application No. PCT/KR2015/000099, which was filed on Jan. 6, 2015, and claims priority to Korean Patent Application No. 10-2014-0001539, which was filed on Jan. 6, 2014, the contents of each of which are incorporated herein by reference.

TECHNICAL FIELD

Various embodiments of the present invention relate to a detachable electronic device.

BACKGROUND ART

With the development of electronics and communication industries, electronic devices (e.g., mobile communication terminals (smart phones), electronic organizers, personal compound terminals, televisions (TVs), laptop computers, tablet PCs, etc.) have become necessities of modern life and have become important means that impart rapidly changing information. These electronic devices may make users' works convenient and may provide various forms of multimedia based on web environments through Graphical User Interfaces (GUIs) using touch screens by which data input/output can be performed in the same area.

The aforementioned electronic devices have changed in various ways according to the current trend to maximize portability, and have convenience of use in order to perform various additional functions. For example, an electronic device may have a support member installed on the rear surface thereof, which is foldable at a specified angle, and may be inclined at a specified angle for watching videos by virtue of the support member. Alternatively, an electronic device may have a separate protection case installed thereon to cover at least a part of the electronic device, and the protection case may protect the exterior of the electronic device while the electronic device is being carried.

These various additional devices enable the electronic devices to be more conveniently used, and have been developed to be more useful.

DETAILED DESCRIPTION OF THE INVENTION

Technical Problem

Various embodiments of the present invention may provide a detachable device.

Various embodiments of the present invention may provide a detachable electronic device that may be used while being detached or coupled, thereby enhancing convenience of use.

Various embodiments of the present invention may provide a detachable electronic device in which detached bodies operate in conjunction with each other, thereby enhancing convenience of use.

Various embodiments of the present invention may provide a detachable electronic device in which one body may be conveniently used by making use of the other body when the bodies are detached from each other.

Various embodiments of the present invention may provide a detachable electronic device that may prevent an attachment from being damaged by an excessive external force greater than a specified force, thereby contributing to the enhancement of the reliability of the product.

Technical Solution

Various embodiments of the present invention may provide an electronic device that includes: a first body that includes a support member installed to be unfolded at a specified mounting angle; and a second body detachably installed in such a manner that at least a part thereof overlaps a mounting surface of the first body, wherein the second body detached from the first body is mounted on the first body using the support member.

Various embodiments of the present invention may provide a cover device that includes: a mounting surface on which at least one electronic device is mounted to overlap the same; one or more stoppers formed along the outer periphery of the mounting surface to surround at least a part of the outer periphery of the electronic device; and a support member installed to be unfolded away from the mounting surface at a specified mounting angle, wherein the electronic device that is detached from the cover device is mounted on the mounting surface using the support member.

Advantageous Effects

According to the various embodiments of the present invention, the detachable cover device includes, for example, the foldable support member, thereby enhancing portability and preventing damage caused by an external force.

MODE FOR CARRYING OUT THE INVENTION

Hereinafter, various embodiments of the present invention will be described in detail with reference to the accompanying drawings. Further, in the following description of the present invention, a detailed description of known functions and configurations incorporated herein will be omitted when it may make the subject matter of the present invention rather unclear. The terms which will be described below are terms defined in consideration of the functions in the present invention, and may be different according to users, intentions of the users, or customs. Therefore, the definitions of the terms should be made based on the contents throughout the specification.

Various embodiments of the present invention relate to a cover device that includes a foldable support member, and the cover device may include an accessory device that may be coupled with a different electronic device.

An electronic device that may be divided into two bodies will be illustrated and described in the various embodiments of the present invention, but the electronic device may be divided into two or more bodies.

In the various embodiments of the present invention, it will be exemplified that at least two bodies serve as electronic devices and operate in conjunction with each other, but the two bodies may be electronic devices that may separately operate without interworking therebetween. Further, at least one of the bodies may be an accessory device that does not include an electronic component.

According to the various embodiments of the present invention, at least one body serving as an electronic device will be exemplified by a tablet PC having a display, but the body is not limited thereto. For example, a portable electronic device having no display may be employed. According to an embodiment, these electronic devices may be applied to various electronic devices, such as a Personal Digital Assistant (PDA), a mobile phone, a smart phone, a net-book, a Mobile Internet Device (MID), an Ultra Mobile PC (UMPC), a tablet Personal Computer (PC), a navigation device, an MP3 player, a wearable electronic device, a flexible electronic device, etc.

Figure 1A:
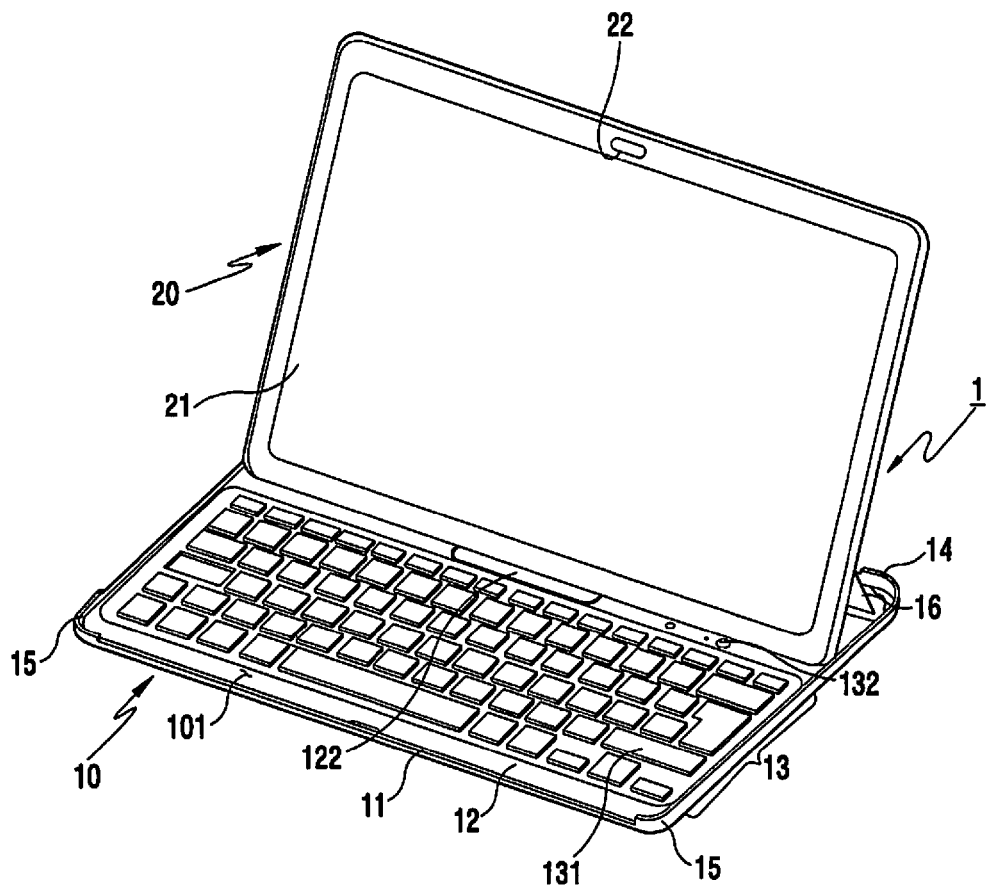
FIGS. 1A and 1B are a perspective view and a side view showing a state in which an electronic device, according to various embodiments of the present invention, is used.
Figure 1B:
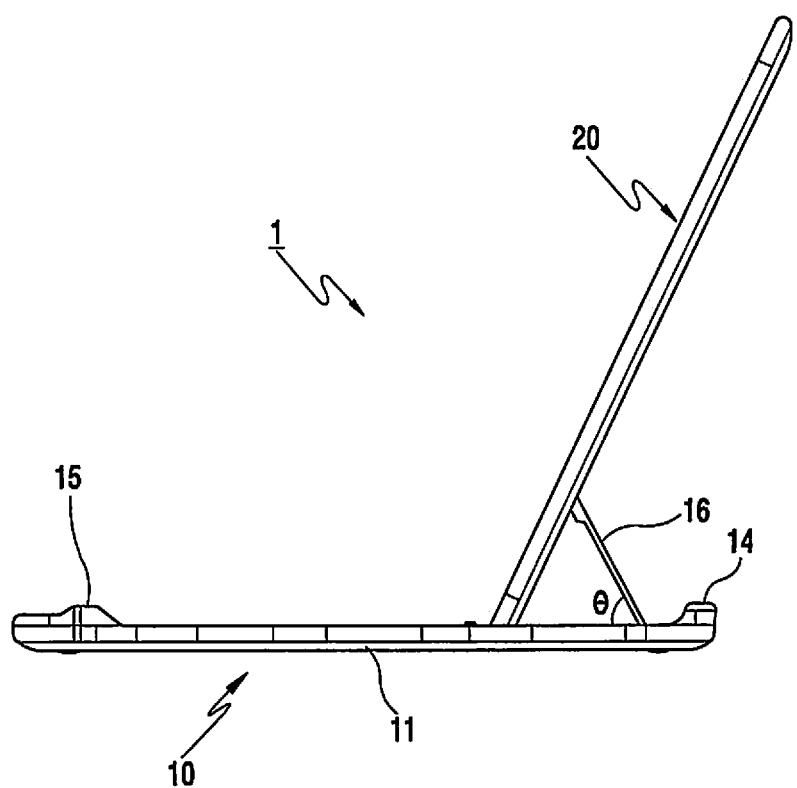
Figure 2:
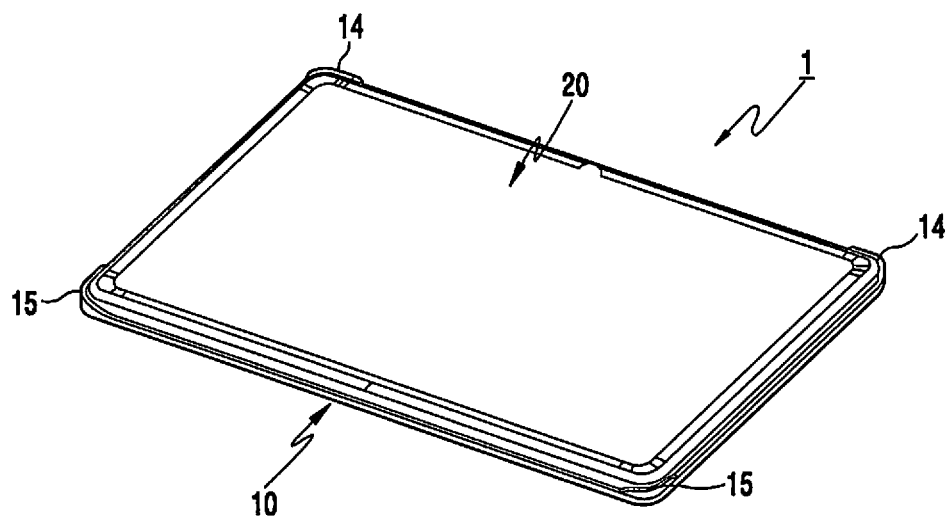
FIG. 2 is a perspective view showing a coupled state of the electronic device, according to an embodiment of the present invention.
Figure 3:
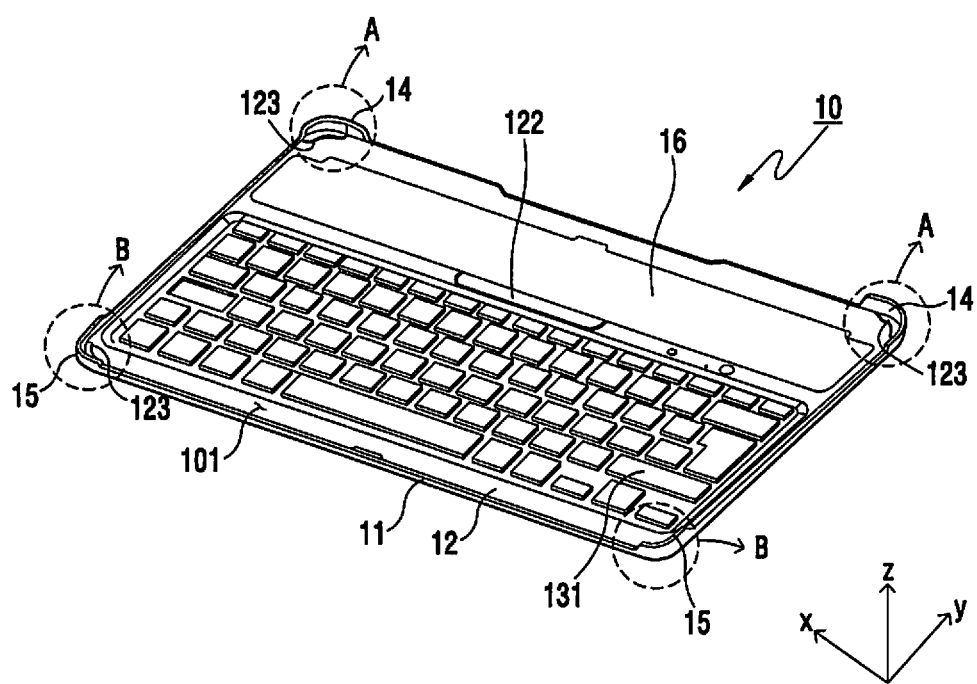
FIG. 3 is a perspective view showing a first body of the electronic device, according to an embodiment of the present invention.

FIGS. 1A and 1B are a perspective view and a side view showing a state in which an electronic device, according to various embodiments of the present invention, is used. FIG. 2 is a perspective view showing a coupled state of the electronic device, according to an embodiment of the present invention. FIG. 3 is a perspective view showing an illustration in which the electronic device is coupled with another electronic device, according to an embodiment of the present invention.

A detachable device 10, according to various embodiments, may have another electronic device 20 mounted thereon at a specified angle. The two devices may be coupled to each other to form a single device. Hereinafter, the detachable device 10 is referred to as the first body, and the other electronic device 20 is referred to as the second body for the convenience of description.

Referring to FIGS. 1A to 3, the electronic device 1 may include the first body 10 and the second body 20 coupled with the first body 10. When the second body 20 is not used, the second body 20 may be coupled with the first body 10, as shown in FIG. 2, in such a manner that the first body 10 is overlaid with the second body 20, thereby enhancing the portability of the electronic device 1. According to an embodiment, the second body 20 may be coupled with the first body 10 in such a manner that the display 21 of the second body 20 is placed in contact with the mounting surface 101 of the first body 10. According to another embodiment, the second body 20 may be coupled with the first body 10 in such a manner that the rear surface of the second body 20 is placed in contact with the mounting surface 101 of the first body 10. According to an embodiment, the second body 20 may be coupled to the first body 10 in all directions of the second body 20.

According to an embodiment, when the second body 20 is used, the second body 20 may be detached from the first body 10 and may be used while being mounted on the first body 10 at a specified angle by a support member 16 that is disposed on the mounting surface 101 of the first body 10. According to an embodiment, the rectangular first and second bodies 10 and 20 have substantially the same shape and size, but are not limited thereto. For example, the first body 10 may receive the second body 20 therein using only a part of the mounting surface 101 thereof.

According to various embodiments, the first body 10 may include, for example, a communication module, an antenna, a processor, a memory, a battery, a connector, a button, a camera, etc. According to various embodiments, the first body 10 may include a key assembly 13 (e.g., a keyboard device) that includes one or more key buttons 131 for inputting data through the second body 20. According to an embodiment, the first body 10 may be wiredly or wirelessly connected with the second body 20 by a short-range communication means. According to an embodiment, the first body 10 may be wiredly connected with the second body 20 through a connector, a contact point, a cable, etc. According to an embodiment, the first body 10 may be connected with the second body 20 by a well-known short-range wireless communication means, such as Bluetooth, WiFi, ZigBee, NFC, etc.

According to an embodiment, the first body 10 may further include a connection button 132 by which the first body 10 is connected with the second body 20. For example, the connection button 132 may be used to connect or disconnect communication between the first body 10 (e.g., an accessory device) and the second body 20 (e.g., a tablet computer).

According to various embodiments, the first body 10 may be turned on or off according to folding/unfolding of the connection member 16. In some embodiments, when the connection member 16 is unfolded, the first body 10 may establish a communication connection with at least one specified second body 20. For example, when the connection member 16 is folded, the first body may disconnect the communication with the at least one specified second body 20. In some embodiments, the power of the first body 10 or the communication with the second body 20 may be controlled according to the degree (e.g., angle) to which the connection member 16 is folded/unfolded.

According to an embodiment, the first body 10 may include the support member 16 that may be unfolded at a specified angle θ relative to the mounting surface 101. According to an embodiment, when the support member 16 is not used, the support member 16 may be maintained in a folded state in such a manner that the support member 16 is coplanar with the mounting surface 101 of the first body 10. When the support member 16 is used, the support member 16 may be unfolded away from the mounting surface 101 and may be maintained at the specified angle relative to the mounting surface 101. According to an embodiment, the first body 10 may include a support member extraction groove 122 that is formed in the mounting surface 101 to extract the support member. According to an embodiment, at least one damper 123 may be additionally installed on the mounting surface 101 of the first body 10. According to an embodiment, the damper 123 may support the second body 20 mounted on the first body 10 in order to alleviate an external shock.

According to an embodiment, the first body 10 may be configured in such a manner that a front case frame 12 and a rear case frame 11 are coupled to each other. According to an embodiment, the front case frame 12 may be used as the mounting surface 101 for receiving the second body 20, and the rear case frame 11 may serve as a part of the exterior of the electronic device 1.

According to an embodiment, the first body 10 may include a plurality of stoppers 14 and 15 that prevent the second body 20 from being unintentionally detached from the mounting surface 101 in the state in which the second body 20 has been mounted on the mounting surface 101. According to an embodiment, the plurality of stoppers 14 and 15 may be integrally formed with the rear case frame 11. According to an embodiment, in order to confine the four corners of the rectangular second body 20, the stoppers 14 and 15 may be formed on the four corresponding corners of the first body 10 (in areas A and B of FIG. 3). Without being limited thereto, however, a varying number of stoppers may be disposed in various positions according to the shape of the second body 20.

According to an embodiment, the stoppers 14 and 15 may include the first stoppers 14 formed on two adjacent corners of the first body 10 and the second stoppers 15 formed on the two remaining corners thereof. According to an embodiment, the first stoppers 14 and the second stoppers 15 may also be alternately disposed on the respective corners of the first body 10. The stoppers 14 and 15 will be described below in detail.

According to an embodiment, the second body 20 may be a portable electronic device, such as a tablet PC that includes the display 21. According to an embodiment, at least one electronic component 22 may be additionally installed on the outer periphery of the display 21. According to an embodiment, the electronic component 22 may include at least one of a speaker module, a microphone module, a camera module, various types of sensor modules, an antenna module, and a key button assembly.

Figure 4:
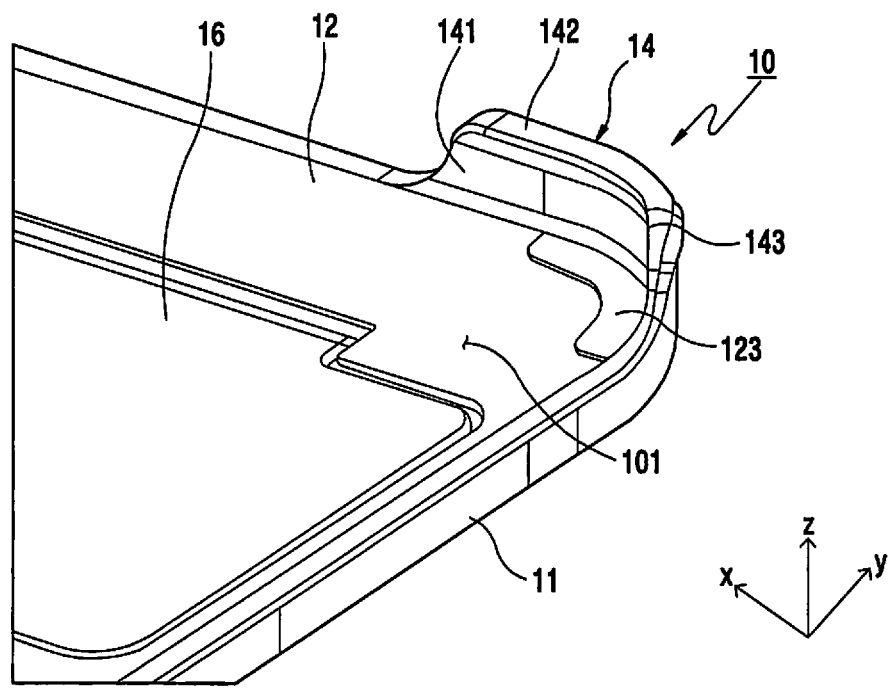
FIG. 4 is an enlarged perspective view of portion A of FIG. 3, according to an embodiment of the present invention.

FIG. 4 is an enlarged perspective view of portion A of FIG. 3, according to an embodiment of the present invention.

Referring to FIG. 4, the first stopper 14 may extend upward (in the Z-axis direction) from the rear case frame 11 of the first body 10. The first stopper 14 may be formed beyond the mounting surface 101. According to an embodiment, the first stopper 14 may extend to a height that is sufficient to receive the thickness of the second body 20 that is mounted on the first body 10.

According to an embodiment, the first stopper 14 may include a support rib 141 that extends upward from the rear case frame 11 and first and second stopping pieces 142 and 143 that protrude from the support rib 141 in directions parallel to the mounting surface 101. According to an embodiment, the first stopping piece 142 may be formed on the outer periphery directed in the X-axis direction with respect to the corner. According to an embodiment, the second stopping piece 143 may be formed on the outer periphery directed in the Y-axis direction with respect to the corner. According to an embodiment, when the second body 20 is mounted on the first body 10, the corresponding corner of the second body 20 may be confined (e.g., secured) by the first and second stopping pieces 142 and 143.

Figure 5A:
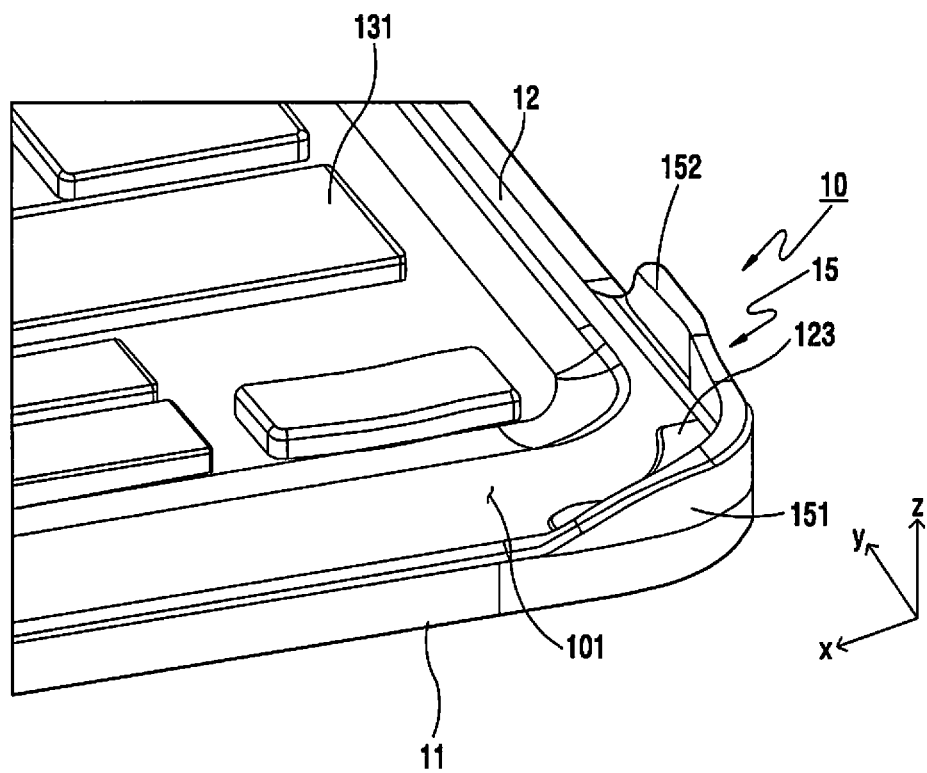
FIGS. 5A and 5B are enlarged perspective views of portion B of FIG. 3, according to an embodiment of the present invention.
Figure 5B:
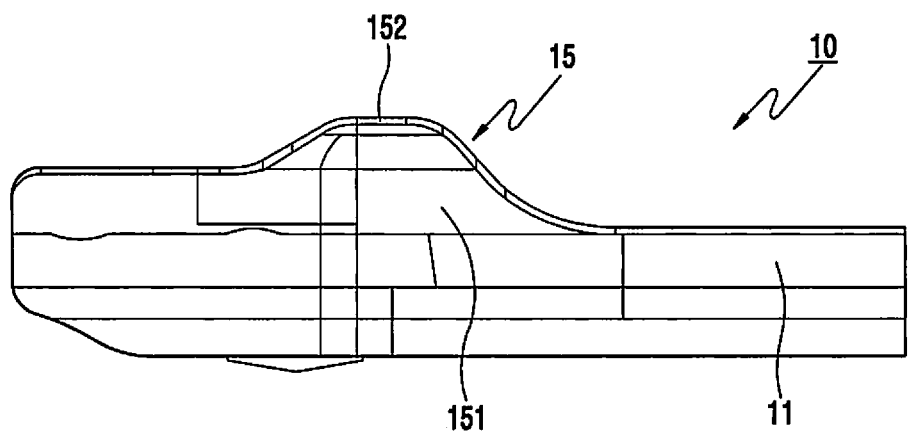
Figure 5C:
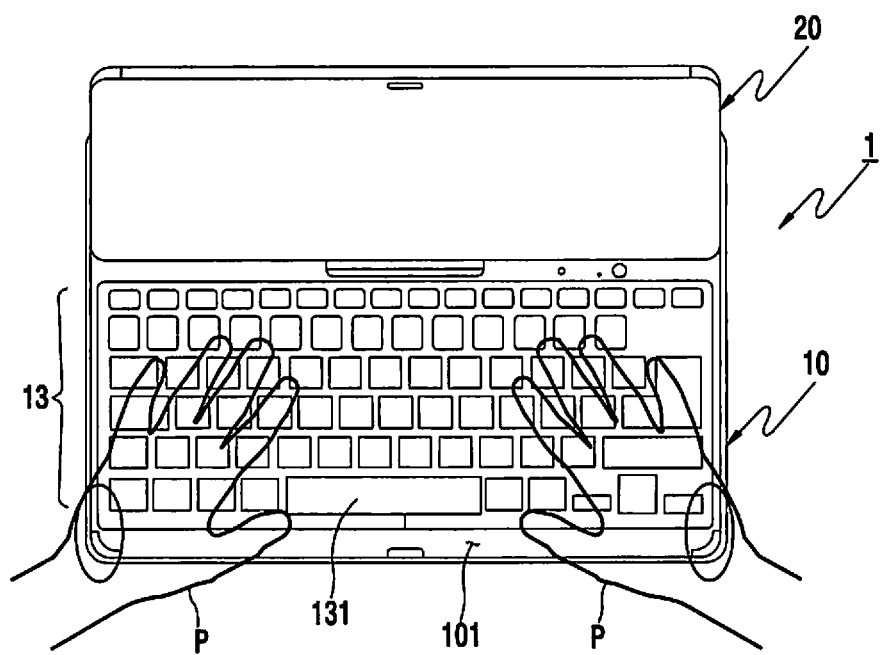
FIG. 5C is a view showing a state in which the electronic device is used, according to an embodiment of the present invention.

FIGS. 5A and 5B are enlarged perspective views of portion B of FIG. 3, according to an embodiment of the present invention. FIG. 5C is a view showing a state in which the electronic device is used, according to an embodiment of the present invention.

Referring to FIGS. 5A and 5B, the second stopper 15 may extend upward (in the Z-axis direction) from the rear case frame 11 of the first body 10. The second stopper 15 may be formed beyond the mounting surface 101. According to an embodiment, the second stopper 15 may extend to a height that is sufficient to receive the thickness of the second body 20 that is mounted on the first body 10.

According to an embodiment, the second stopper 15 may include a support rib 151 that extends upward from the rear case frame 11 and a stopping piece 152 that protrudes from the support rib 151 in a direction parallel to the mounting surface 101. According to an embodiment, the stopping piece 152 may be formed on the outer periphery directed in the Y-axis direction with respect to the corner. According to an embodiment, when the second body 20 is mounted on the first body 10, the corresponding corner of the second body 20 may be secured by the stopping piece 152.

Referring to FIG. 5C, the first body 10 may include the plurality of stoppers 14 and 15, and the stoppers 14 and 15 extending upward from the first body 10 may act as obstacles when a user operates the keypad assembly. According to an embodiment, the first stoppers 14, each of which has the stopping pieces 142 and 143 formed in the X- and Y-axis directions, may be disposed on the upper portion of the first body 10, which is spaced apart from the keypad assembly 13, and the second stoppers 15, each of which has the stopping piece 152 formed in the Y-axis direction, may be disposed on the lower portion of the first body 10, which is adjacent to the keypad assembly 13. Accordingly, the user's palms are less affected by the second stoppers 15 that have no stopping piece formed in the X-axis direction.

Figure 6:
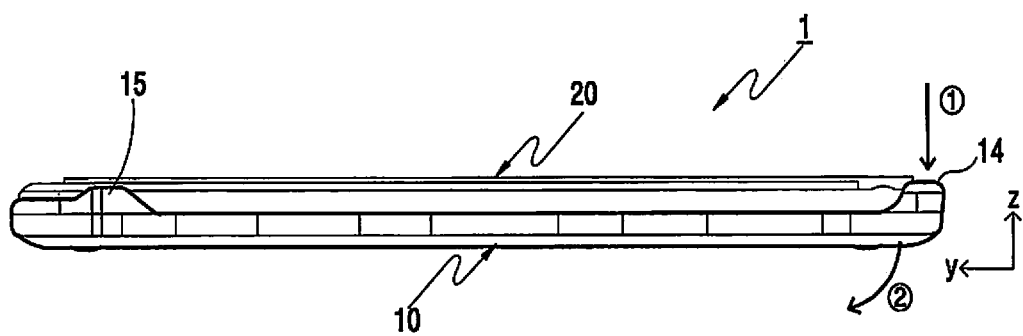
FIG. 6 is an operational view showing a process of disassembling the electronic device, according to an embodiment of the present invention.

FIG. 6 is an operational view showing a process of disassembling the electronic device, according to an embodiment of the present invention.

Referring to FIG. 6, the second body 20 may be mounted on the first body 10, for example, in such a manner that the mounting surface 101 of the first body 10 and the display 21 face each other. In this case, the second body 20 may not be arbitrarily detached from the first body 10 because the four corners of the second body 20 are confined by the stopping pieces 142, 143, and 152 of the first and second stoppers 14 and 15 that are formed on the four corners of the first body 10.

According to an embodiment, when detaching the second body 20 from the first body 10, the user may detach the second body 20 by primarily pressing the first stoppers 14 of the first body 10 in direction ① (Z-axis direction) and then pulling the same in direction ②, as shown in FIG. 6. According to the structure of the stoppers 14, for example, when the user applies a force in the direction opposite to the Y-axis direction (e.g., −Y-axis direction), the second body 20 may be separated from the stoppers 14. When the second body 20 is separated from the stoppers 14, the user may separate the second body 20 from the second stoppers 15 by moving the detached second body 20 upward while holding the same. Accordingly, the second body 20 may be detached from the first body 10.

Figure 7:
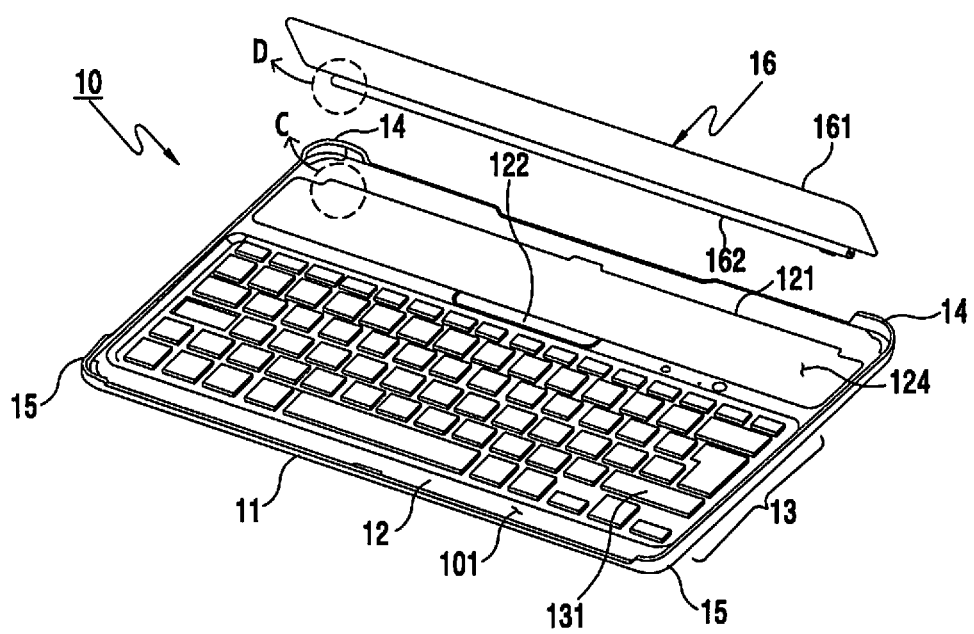
FIG. 7 is an exploded perspective view showing a state in which a support member is mounted on the first body of the electronic device, according to an embodiment of the present invention.

FIG. 7 is an exploded perspective view showing an illustration in which the support member is connected to the first body of the electronic device, according to an embodiment of the present invention.

Referring to FIG. 7, the support member 16 may be installed on the first body 10 in order to mount the detached second body at the specified angle θ. The support member 16 may be rotatably installed in a receiving slit 121 that is formed in the front case frame 12 of the first body 10 in the longitudinal direction. According to an embodiment, the support member 16 may include a plate 161 for supporting the second body 20 and a hinge arm 162 that is provided on the lower end of the plate 161 and is hingedly coupled to opposite sides of the receiving slit 121. According to an embodiment, the hinge arm 162 may be integrally formed with the plate 161. According to an embodiment, the support member 16 may be formed of at least one of metal and a synthetic resin.

According to an embodiment, when the support member 16 is not used, the support member 16 may be maintained in a folded state in such a manner that the support member 16 is coplanar with the mounting surface 101 of the first body 10, and when the support member 16 is used, the support member 16 may be unfolded away from the mounting surface 101 and may be maintained at the specified angle relative to the mounting surface 101. According to an embodiment, a support member mounting groove 124 in which the support member 16 is seated may be formed in the mounting surface 101 of the first body 10, and the receiving slit 121 may be disposed in such a manner that the receiving slit 121 extends from the support member mounting groove 124. According to an embodiment, when the support member 16 is folded, the support member 16 may be coplanar with the mounting surface 101 of the first body 10, or may be disposed lower than the mounting surface 101. According to an embodiment, when the second body 20 is mounted while the support member 16 is unfolded, the receiving slit 121 may receive an end portion of the second body 20 therein in order to prevent the second body 20 from sliding. According to an embodiment, when the second body 20 is mounted while the support member 16 is unfolded, the support member mounting groove 124 may receive an end portion of the second body 20 therein in order to prevent the second body 20 from sliding.

According to an embodiment, a magnet may be provided in at least a part of the receiving slit 121 to connect the second body 20 with the first body 10.

Figure 8A:
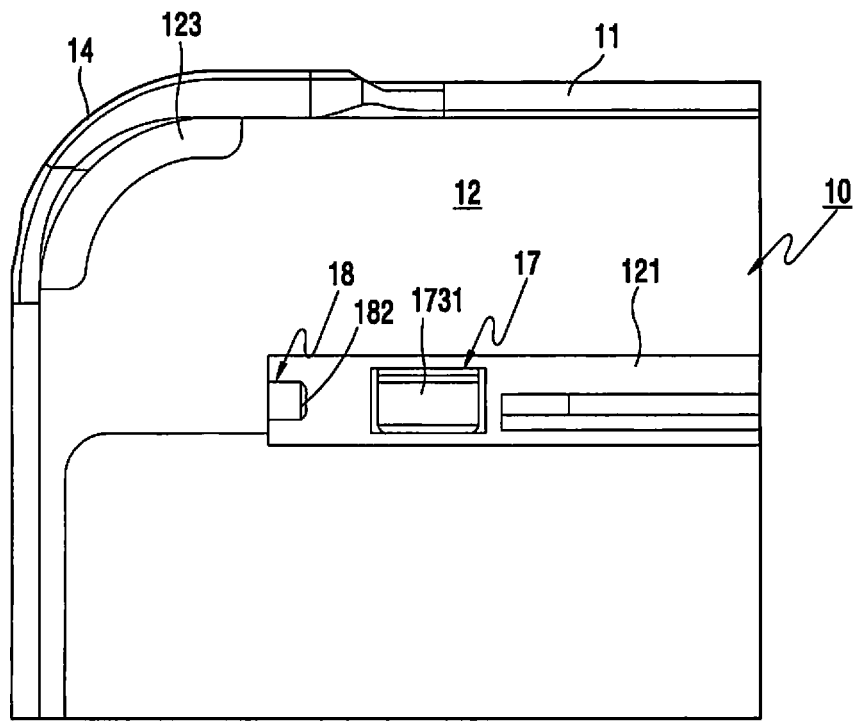
FIG. 8A is an enlarged view of portion C of FIG. 7, according to an embodiment of the present invention.
Figure 8B:
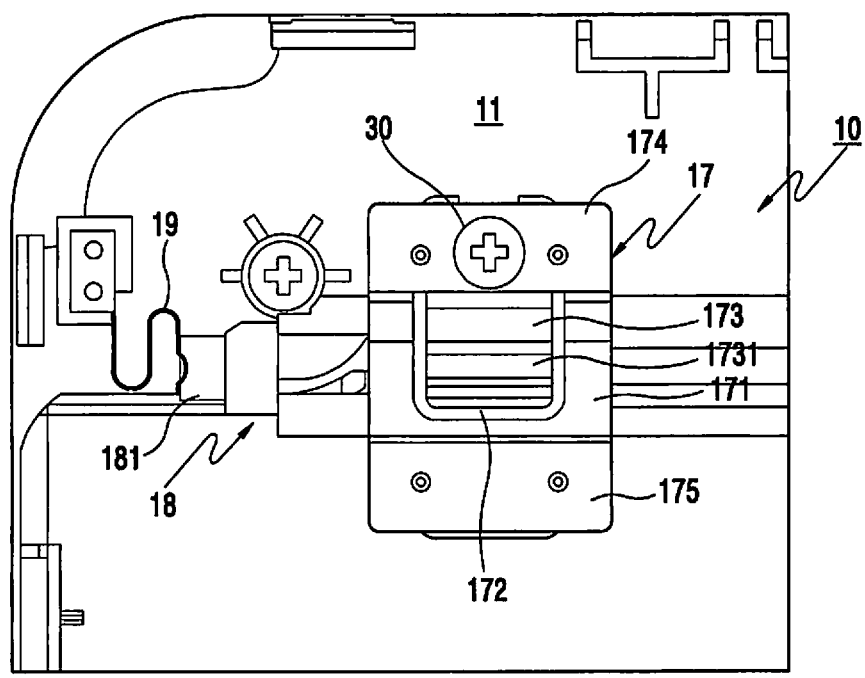
FIG. 8B is a view showing a state in which the support member and a hinge shaft are installed in the first body of the electronic device, according to an embodiment of the present invention.
Figure 8C:
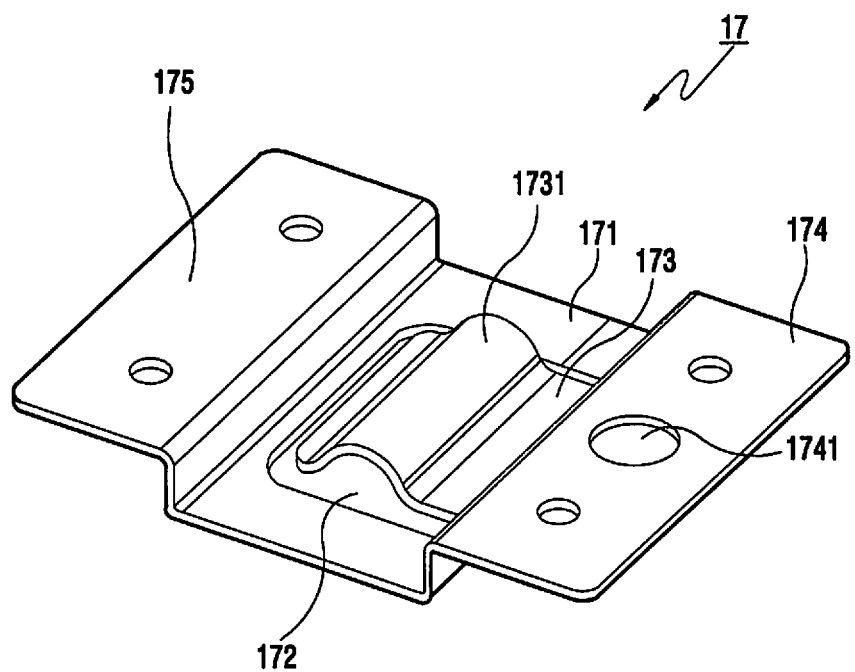
FIG. 8C is a perspective view of a stopper according to an embodiment of the present invention.
Figure 8D:
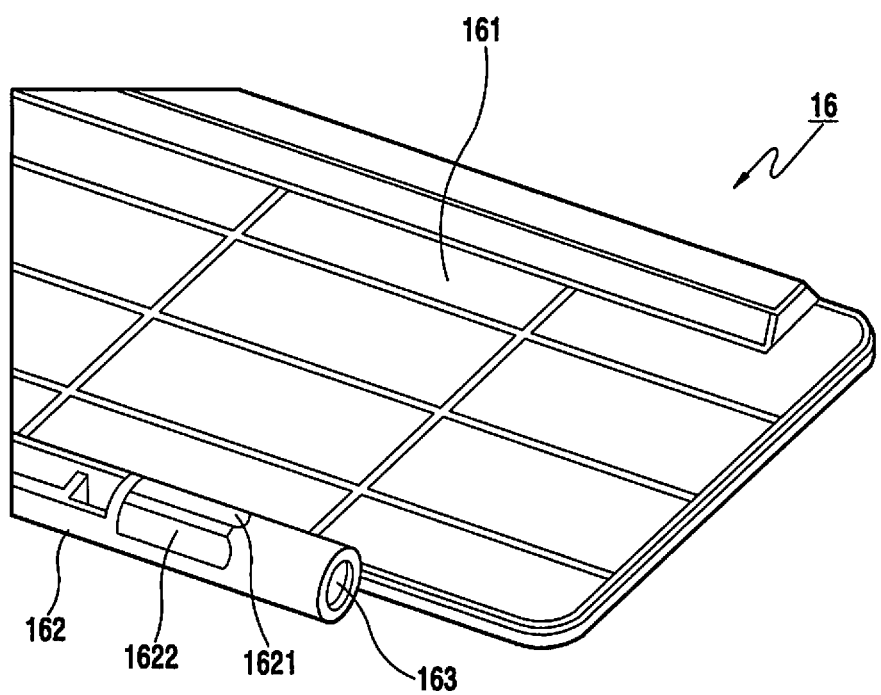
FIG. 8D is an enlarged perspective view of portion D of FIG. 7, according to an embodiment of the present invention.

FIG. 8A is an enlarged view of portion C of FIG. 7, according to an embodiment of the present invention. FIG. 8B is a view showing a state in which the support member and a hinge shaft are installed in the first body of the electronic device, according to an embodiment of the present invention. FIG. 8C is a perspective view of a retainer according to an embodiment of the present invention. FIG. 8D is an enlarged perspective view of portion D of FIG. 7, according to an embodiment of the present invention.

Referring to FIG. 8A, a shaft part 182 of the hinge shaft 18 may protrude from one side of the receiving slit 121. According to an embodiment, the shaft part 182 may confine the support member 16 in such a manner that the shaft part 182 is inserted into a shaft receiving recess 163 (shown in FIG. 8D) that is formed in a side surface of the hinge arm 162 of the support member 16.

According to an embodiment, a protrusion 1731 of the retainer 17 may be installed in the receiving slit 121. The protrusion 1731 of the retainer 17 may be installed in a position where the protrusion 1731 is selectively positioned in recesses 1621 and 1622 (shown in FIG. 8D) that are formed in the hinge arm 162 of the support member 16.

Referring to FIGS. 8B and 8C, the retainer 17 may be installed on a part of the rear case frame 11, which corresponds to the receiving slit 121. According to an embodiment, the retainer 17 may include a body 171 having an opening 172 formed therein, a tension rib 173 extracted from the opening 172, and the protrusion 1731 that protrudes from the tension rib 173 toward the receiving slit. According to an embodiment, flanges 174 having a screw introduction hole 1741 may be formed on opposite sides of the body 171 and may be secured to the rear case frame 11 by a fastening means, such as a screw 30, etc. According to an embodiment, the tension rib 173 may be formed to be bent downward by pressing the protrusion 1731.

According to an embodiment, the hinge shaft 18 may include a head 181 that is received in the first body 10 and the shaft part 182 that is integrally formed with the head 181 and has a part that protrudes toward the receiving slit 121 of the first body 10. According to an embodiment, the hinge shaft 18 may be formed of a synthetic resin material or a metal material. According to an embodiment, the head 181 of the hinge shaft 18 may be pressed toward the receiving slit by a resilient member 19 that is installed in the rear case frame 11. According to an embodiment, the protruding shaft part 182 within the receiving slit 121 may move toward the inside of the first body 10 while being pressed by the resilient member 19. When the pressure is removed, the shaft part 182 may return to the original position by the resilient member 19. By virtue of the above configuration, the support member 16 may be separated from the shaft part 182 without damage when being unfolded at a preset angle or more. According to an embodiment, various members (such as a plate spring, a coil spring, etc.) that are capable of pressing the head 181 may be used as the resilient member 19.

Referring to FIG. 8D, the support member 16 may include: the plate 161 for mounting the second body 20 at a specified angle relative to the mounting surface 101 of the first body 10 and maintaining the second body 20 in the mounted state; and the hinge arm 162 that is provided on one end of the plate 161 and is hingedly coupled to the receiving slit 21 of the first body 10 so as to be rotatable.

According to an embodiment, the shaft receiving recess 163 for receiving the shaft part 182 of the hinge shaft 18 may be formed in one side surface of the hinge arm 162. According to an embodiment, the plurality of recesses 1621 and 1622 may be formed in the outer circumferential surface of the hinge arm 162 at a predetermined interval. According to an embodiment, when the support member 16 is folded toward the mounting surface 101 of the first body 10, the first recess 1621 may be disposed in a position where the first recess is positioned on the protrusion 1731 formed on the tension rib 173 of the retainer 17.

According to an embodiment, when the support member 16 is unfolded away from the mounting surface 101 of the first body 10, the second recess 1622 may be disposed in a position where the second recess is positioned on the protrusion 1731 formed on the tension rib 173 of the retainer 17. According to an embodiment, the support member 16 may not move while being maintained in the folded or unfolded state by the operation in which the protrusion 1731 of the retainer 17 is positioned in the recess 1621 or 1622.

According to an embodiment, when the support member 16 is unfolded away from the mounting surface 101 of the first body 10, the second recess 1622 may be disposed in a position where the second recess is positioned on the protrusion 1731 formed on the tension rib 173 of the stopper 17. According to an embodiment, the support member 16 may not move while being maintained in the folded or unfolded state by the operation in which the protrusion 1731 of the stopper 17 is positioned in the recess 1621 or 1622.

According to various embodiments, the hinge shaft 18 may be disposed on the left and right sides of the receiving slit 121, and the resilient member 19 that presses the hinge shaft 18 may be installed to press at least one of the pair of hinge shafts. According to an embodiment, the hinge shaft 18 may be disposed on only one side of the receiving slit 121.

According to various embodiments, the hinge shaft 18 may be installed on the support member 16, and the shaft receiving recess 163 may be formed in the mounting surface.

Figure 9:
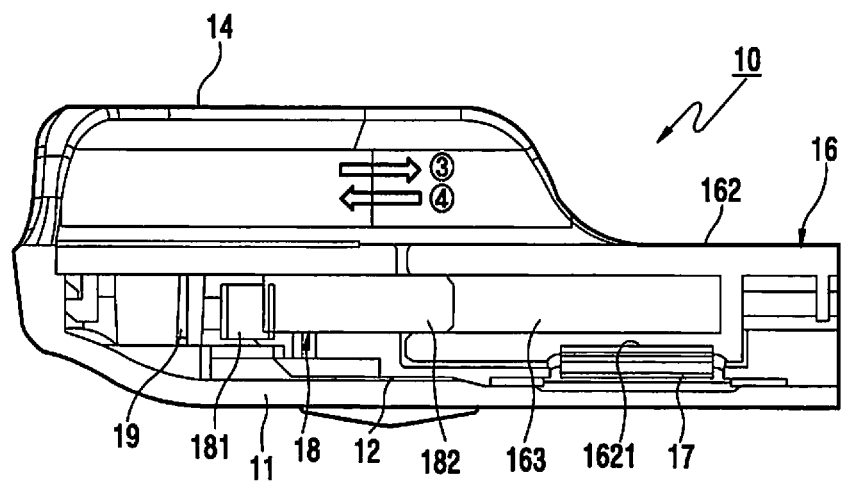
FIG. 9 is a sectional view showing the state in which the support member and the hinge shaft are installed in the first body of the electronic device, according to an embodiment of the present invention.

FIG. 9 is a sectional view showing the state in which the support member and the hinge shaft are installed in the first body of the electronic device, according to an embodiment of the present invention.

Referring to FIG. 9, the support member 16 may be rotatably coupled in such a manner that the shaft part 182 of the hinge shaft 18 is inserted into the shaft receiving recess 163 of the hinge arm 162. In this case, the shaft part 182 of the hinge shaft 18 may be pressed toward the receiving slit (in direction ③ of FIG. 9) by the resilient member 19 that is disposed within the first body 10. According to an embodiment, when the support member 16 is to be unfolded at an angle larger than the opening angle θ by an excessive force, the shaft part 182 may be separated from the shaft receiving recess 163 of the support member 16 and may move toward the inside of the first body 10 (in direction ④ of FIG. 9) to separate the support member 16 from the first body 10, thereby preventing damage to the support member 16. According to an embodiment, the shaft part 182 may have a predetermined length in order to allow the support member 16 to be separated from the shaft part 182 when a predetermined force is applied to the support member 16.

According to an embodiment, in a case of coupling the separated support member 16 back to the first body 10, the support member 16 may be coupled by inserting the shaft part 182 protruding from one side of the receiving slit 121 into the shaft receiving recess 163 formed on one side of the hinge arm 162 of the support member 16, pressing the shaft part 182, which protrudes from the opposite side of the receiving slit 121, toward the inside, and inserting the other shaft part into the shaft receiving recess 163 formed on the opposite side of the hinge arm 162.

Figure 10A:
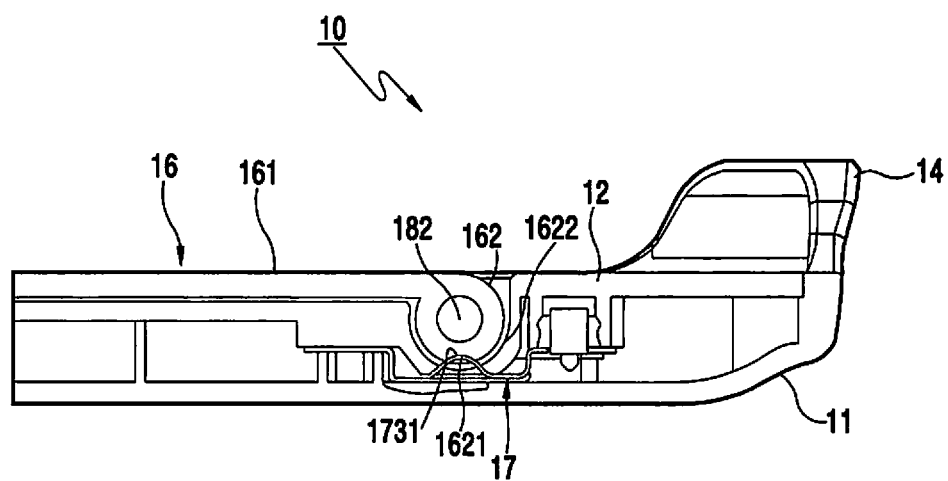
FIGS. 10A and 10B are views showing the operation of the support member, according to an embodiment of the present invention.
Figure 10B:
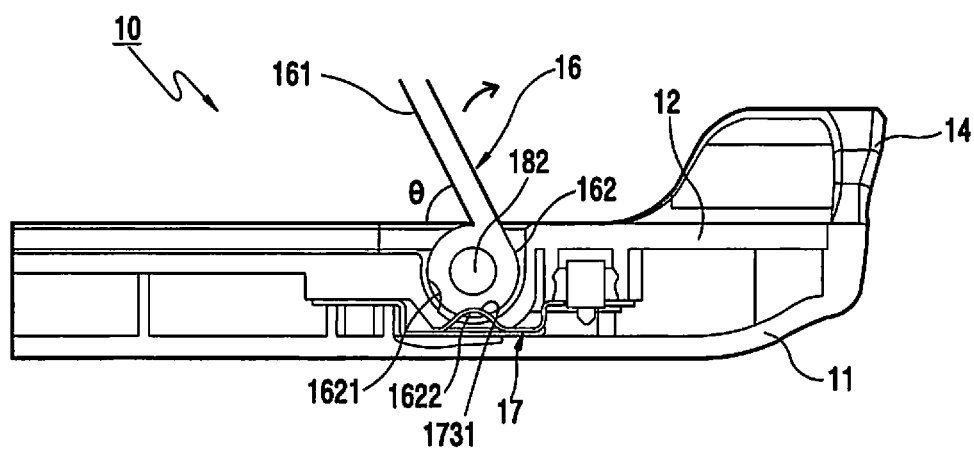

FIGS. 10A and 10B are views showing the operation of the support member, according to an embodiment of the present invention.

Referring to FIGS. 10A and 10B, according to an embodiment, when the support member 16 is folded toward the mounting surface 101 of the first body 10 and is coplanar with the mounting surface 101, the first recess 1621 may be positioned on the protrusion 1731 formed on the tension rib 173 of the retainer 17. According to an embodiment, when the support member 16 is unfolded away from the mounting surface 101 of the first body 10 at the mounting angle θ, the second recess 1622 may be positioned on the protrusion 1731 formed on the tension rib 173 of the retainer 17.

According to an embodiment, the support member 16 may be maintained in the folded or unfolded state by the operation in which the protrusion 1731 of the retainer 17 is positioned in the recess 1621 or 1622.

According to various embodiments of the present invention, the two recesses 1621 and 1622 are formed in the hinge arm 162 of the support member 16, but the present invention is not limited thereto. For example, two or more recesses may be formed in order to unfold the support member at various angles. According to an embodiment, the support member 16 may be maintained in the unfolded state by using a resilient member (e.g., a plate spring, a coil spring, etc.). For example, in the case where the support member 16 is maintained in the unfolded state by using the resilient member, the support member 16 may be fixed using a mechanical structure, which includes a fastening recess, etc., in the folded state.

According to an embodiment, at least one second body having various sizes and types may be mounted on the first body by the support member that rotates at various opening angles.

It will be apparent to those skilled in the art that various modifications and changes falling within the scope of the appended claims may be made to these embodiments. In other words, the embodiments may be implemented in a very variety of ways without departing from the sprit and scope of the present invention as defined by the appended claims.

The invention claimed is:

1. An electronic device comprising:
a first body comprising a mounting surface and a receiving slit formed in the mounting surface;
a support member installed to be unfolded at a specified mounting angle on the mounting surface of the first body and having a hinge arm;
a second body detachably installed in such a manner that at least a part thereof overlaps the mounting surface of the first body, and
a retainer installed in the receiving slit of the first body, wherein the second body detached from the first body is mounted on the first body using the support member,
wherein the support member comprises at least one shaft receiving recess and at least one recess formed in an outer circumferential surface of the hinge arm,
wherein the retainer comprises a plate-shaped body having an opening, a tension rib extending from the plate-shaped body toward the opening, and a protrusion formed to protrude from the tension rib, and
wherein the protrusion is installed in a position of the receiving slit that corresponds to the at least one recess to prevent the support member from arbitrarily rotating.

2. The electronic device of claim 1, wherein the first body comprises at least one stopper extending to a height corresponding to the thickness of the second body from a case frame of the first body to confine the mounted second body.

3. The electronic device of claim 2, wherein the first body is formed in a rectangular shape, and the stopper is formed on at least one corner of the first body.

4. The electronic device of claim 3, wherein the stopper comprises:
at least one support rib vertically extending from the first body; and
at least one stopping piece formed to be bent from the support rib in a direction parallel to the mounting surface of the first body.

5. The electronic device of claim 1, wherein the plate-shaped body is configured to support the second body, and wherein the hinge arm extends from the plate-shaped body and is rotatably installed in the receiving slit.

6. The electronic device of claim 1, wherein the at least one shaft receiving recess is formed in opposite side surfaces of the hinge arm, the first body comprises hinge shafts in which shaft parts are installed to protrude from opposite side surfaces of the receiving slit, and the support member is rotatably secured to the first body in such a manner that the shaft parts are inserted into the shaft receiving recesses.

7. The electronic device of claim 6, wherein each of the hinge shafts comprises:

a head installed inside the first body and pressed by a resilient member in the direction of the receiving slit; and a shaft part extending from the head, wherein a part of the shaft part protrudes toward the receiving slit.

8. The electronic device of claim 1, wherein a pair of recesses is formed at a predetermined interval, and the protrusion is positioned in each recess when the support member is completely unfolded away from the first body and when the support member is completely folded toward the first body.

9. The electronic device of claim 1, wherein the protrusion is formed to protrude from the tension rib and configured to protrude toward the receiving slit, and wherein a flange extends from one side, or opposite sides, of the plate-shaped body and is secured to the first body.

10. The electronic device of claim 1, wherein the first body comprises a support member mounting groove that is formed in the mounting surface to receive the support member therein.

11. The electronic device of claim 10, wherein the support member mounting groove is formed such that the support member is coplanar with, or lower than, the mounting surface when the support member is folded toward the first body.

12. The electronic device of claim 11, wherein the support member mounting groove comprises a support member extraction groove that is formed to make the support member easily unfolded when the support member has been folded.

13. The electronic device of claim 1, wherein the first body and the second body operate separately or in conjunction with each other.

* * * * *